United States Patent [19]
Gau et al.

[11] Patent Number: 6,003,907
[45] Date of Patent: Dec. 21, 1999

[54] ROTATABLE BALL-BEARING JOINT FOR PRESSURE HOSE

[75] Inventors: Günter Gau, Wuppertal; Jochen Seelbach, Düsseldorf, both of Germany

[73] Assignee: Stolco Stoltenberg-Lerche GmbH & Co. KG, Düsseldorf, Germany

[21] Appl. No.: 08/945,717

[22] PCT Filed: May 2, 1996

[86] PCT No.: PCT/EP96/01816

§ 371 Date: Jan. 21, 1998

§ 102(e) Date: Jan. 21, 1998

[87] PCT Pub. No.: WO96/35070

PCT Pub. Date: Nov. 7, 1996

[30] Foreign Application Priority Data

May 5, 1995 [DE] Germany .................. 195 16 115

[51] Int. Cl.⁶ .................................................. F16L 27/00
[52] U.S. Cl. ..................... 285/279; 285/276; 384/512; 384/513; 384/514; 384/517
[58] Field of Search ..................... 285/41, 148.4, 285/275, 276, 279, 281, FOR 102; 384/512, 513, 514, 517, 615; 403/164, 375

[56] References Cited

U.S. PATENT DOCUMENTS

| | | | |
|---|---|---|---|
| 2,462,006 | 2/1949 | Schmitter et al. | 285/279 X |
| 4,215,807 | 8/1980 | Ritter et al. | 227/21 |
| 4,215,907 | 8/1980 | Pohl . | |
| 4,449,739 | 5/1984 | Raether | 285/281 X |
| 5,048,982 | 9/1991 | Nakanishi | 384/514 X |
| 5,573,280 | 11/1996 | Salter et al. | 285/276 X |

FOREIGN PATENT DOCUMENTS

| | | | |
|---|---|---|---|
| 749204 | 11/1944 | Germany | 285/275 |
| 1475684 | 2/1969 | Germany . | |
| 1425564 | 11/1972 | Germany . | |
| 2711584 | 9/1978 | Germany . | |
| 4419524 | 12/1995 | Germany . | |
| 1906 | of 1849 | United Kingdom | 384/517 |
| 833179 | 4/1960 | United Kingdom . | |

*Primary Examiner*—Eric K. Nicholson
*Assistant Examiner*—Greg Binda
*Attorney, Agent, or Firm*—Milton Oliver Ware, Fressola, Van Der Sluys & Adolphson LLP

[57] ABSTRACT

A rotating joint for pressure hoses has a plug-in part (1) with a hollow pin (4) that projects into and is sealed against a receiving part (2). The rotating joint also has a rolling bearing, in particular a ball bearing, that has an outer race joined to the receiving part (2) and a inner race joined to the plug-in part (1), as well as two coaxially-arranged elastically biased angular ball bearings (K1 and K2). The angular ball bearings are biased by a thrust collar (21) under pressure, which is slipped onto the hollow pin (4) coaxially to the receiving part (2).

15 Claims, 2 Drawing Sheets

ROTATABLE BALL-BEARING JOINT FOR PRESSURE HOSE

The invention concerns a rotating joint for pressure pipes with a receiving part, with a plug-in part that has a hollow pin which projects into and is sealed against the receiving part, with a housing part that is securely attached to the receiving part, and with a rolling bearing, particularly a ball bearing between the plug-in part and the housing part.

BACKGROUND

When a hose is connected to a pipe, the problem of the hose twisting during use occurs and the turns remain in the hose jacket. Conventional hose joints, such as are known for example from DE 14 25 564, TAFELMAIER do not let the hose untwist itself by rotation of the joint. With such joints a spout is placed on the hose which in turn is inserted as a plug-in part into a receiving part. The plug-in part and the receiving part are often joined with a quick interlock which contains a locking device in the form of balls. Because of the ball configuration it is possible to rotate the hose in the joint when considerable force is used.

A simple hose, for example a water hose whose jacket is made of a flexible material, is not particularly sensitive to turns in the jacket. However hoses through which highly pressurized media flow are often surrounded by a metal hose. Turns in such pressure hoses can easily lead to the destruction of the jacket. It is therefore especially indicated to connect pressure hoses to pipes by means of joints that are able to rotate.

A simple form of rotating hose screw connection for pressure hoses is known from DE OS 27 11 584, RUMP,. The spout is for example provided with a guide nose which is able to rotate inside a threaded lug to prevent transmitting the rotation movements of a connected hand tool to the hose. In that case the guide nose is sealed with an O-ring. This form of rotating hose screw connection can only withstand high pressure under certain conditions and is therefore not suitable for this use. In addition, the friction-type bearing of the rotating connection fails when the individual components expand differently due to hot media flowing through them, because the friction in the bearing increases.

A rotating connection for fluid pipe lines with a locally stationary and a connected part which rotates or swivels around it is known from DE-OS 14 75 684, PILOT, wherein a rolling bearing provides low friction rotation between the parts. This rotating connection is particularly suited for supplying pressurized lubricating liquids to rapidly rotating shafts. To ensure a safe rotation, the rotating shaft passes through a double-row angular contact ball bearing and an opening. The installation of the individual components and their precise orientation is very costly. Since the hollow pin of the connecting part is relatively long and has a small diameter, it is difficult to carry off heat when hot media, particularly steam, pass through it. The components expand to different degrees and jam. This rotating connection is therefore not suitable for safely joining steam pressure hoses.

SUMMARY OF THE INVENTION

The objective of the invention is to create a rotating joint which is simple to install and operates reliably under extreme conditions, whereby especially a steam pressure hose can be connected to a pipe so that it is able to rotate.

The X-shaped arrangement of paired bearings, which are elastically biased by a spring, particularly a disk spring, automatically centers the plug-in part in the receiving part. The use of disk springs also provides a balance for potential production tolerances. The rotating joint of the invention makes a simple installation of the pressure hose possible in that the orientation of the individual components with each other no longer requires being taken into account. At the same time any difference in the expansion of components due to unequal heating has no deleterious effect on the function of the rotating joint. Furthermore the use of ball cages can be omitted in an advantageous configuration. It is an advantage if the components of the rotating joint are made of rust- and acid-resistant VA steel and the balls are made of roller bearing steel. It is advantageous to use materials for the components according to the German industry norm (DIN) 3339.

The rotating joint is used to advantage as a connection fitting between steam and hot water hoses and/or spray nozzles, or between the rigid connector and the hose. In a special embodiment the plug-in part is a casting which has formed shapes on its surface. These formed shapes are advantageous insofar as the uniform wall thickness of the plug-in part, which is achieved thereby, contributes to its uniform expansion during heating, so that jamming is prevented in the guide. The formed shapes enlarge the surface and provide good heat transfer. Furthermore the formed shapes help to save material.

In conjunction with the flexible application of the ball bearing, the rotating joint is therefore especially suitable for joining hoses which conduct steam under high temperatures and pressures. The rotating joint provides a safe connection for pressure hoses under 18 bar of steam and at 210° C. It therefore complies with the requirements of the German industry norm for steam hoses and their fittings (DIN 2825 and DIN 2826).

It is a particular advantage of the rotating joint that the compression strength and the seal are maintained if the flexible bearing fails, since the plug-in part rests against the housing edge and will not slide out of the receiving part. Should the seals also break between the plug-in part and the receiving part, and the balls in the bearings are damaged by aggressive media, the seal of the rotating joint is assured by the screwed-in housing and any bursting of the joint is prevented. In such a case the space between the plugged-in parts and the housing serves as a pressure space, which although it is not absolutely sealed, remains tightly and mechanically closed. The housing is designed so that the pressure space created by a leak withstands the load. The steam condenses in this pressure space and exits as water from the side that faces away from the user.

It is particularly advantageous to construct the grooves of the plug-in part in which the balls run so that one of their walls lies in the axis of the rotating joint while the other axis forms an angle of especially 15° with the vertical. The resulting relatively large 75° acceptance angle of the grooves simplifies their manufacture and has a positive effect on the production costs. The axis-parallel wall makes a simple installation of the balls possible.

The acceptance angle of about 75° in a groove provides for a secure holding of the balls. The danger of a ball bearing jamming can thus be minimized.

Since the rotating joint becomes extremely hot when hot media particularly steam flows through it, the rotating joint is provided with a contact protection in an advantageous configuration. The contact protection makes it possible to safely handle the rotating joint at any time. To reduce the heat transfer and thereby the heating of the contact protection, it is advantageous to weld it only to a small bearing surface on the receiving part.

In addition, the rotating joint of the invention is remarkable in that, if the inner seal between the receiving part and the plug-in part is destroyed, the medium cannot escape from the rotating joint, or only to a very small degree. The leak is prevented by an additional seal between the plug-in part and the housing.

It is furthermore advantageous that even if the ball bearings are damaged, the function of the rotating joint remains assured since an edge of the housing is used to support the plug-in part. This keeps the plug-in part safely in the housing and allows it to rotate even if the ball bearings are damaged.

The rotating joint of the invention ensures the seal, the strength of the components and the ability to rotate under extreme conditions.

BRIEF FIGURE DESCRIPTION

Embodiments of the invention are illustrated in the drawings and are described in greater detail in the following, where:

DETAILED DESCRIPTION

Figure 1:
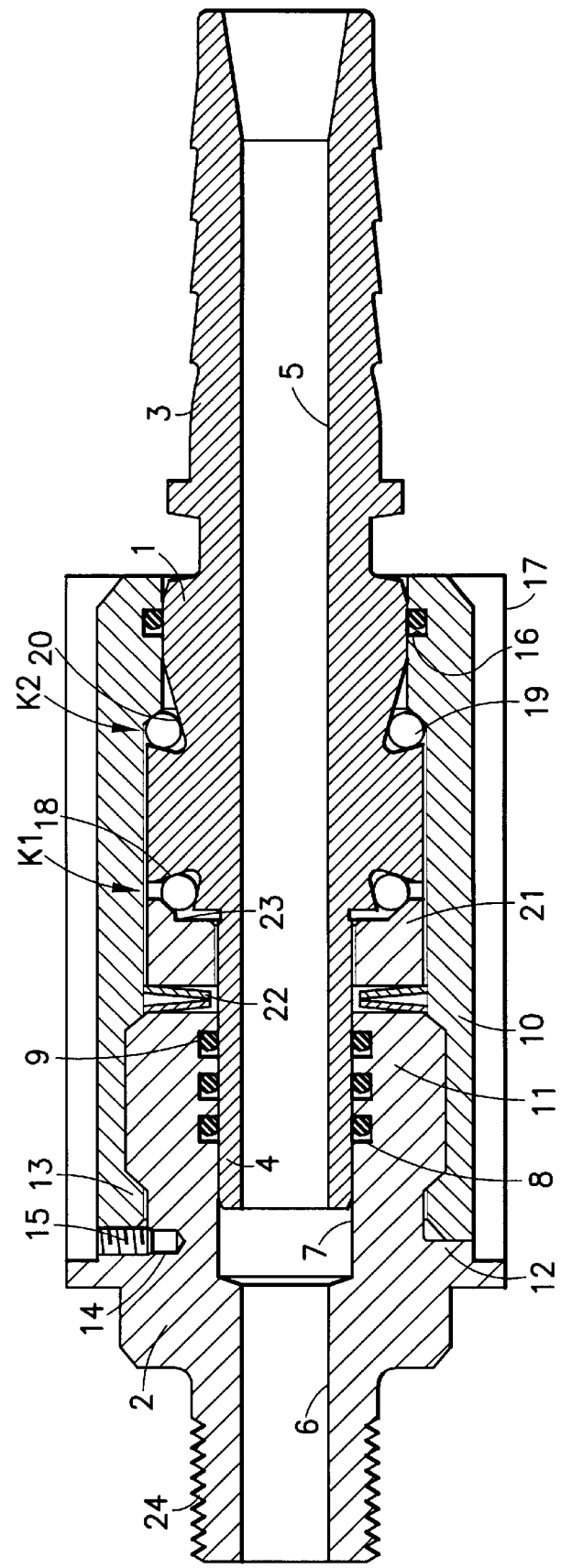
FIG. 1 is a rotating joint.

FIG. 1 illustrates a rotating joint whereby a plug-in part 1 is connected to a receiving part 2 so that it can rotate. Both the plug-in part 1 and the receiving part 2 have rotational symmetry and each has a bore 5 and 6 with the same diameter. Two angular ball bearings K1 and K2 are installed between the receiving part 2 and the plug-in part.

The plug-in part 1 is equipped with a hose spout 3, over which a not illustrated pressure hose can be slipped, which can be secured in particular with pairs of not illustrated clamp shells. On the side that faces away from the spout 3, the plug-in part 1 forms a hollow pin 4 which projects into a bore 7 of the receiving part 2. Grooves 8 are provided in the bore 7 and are used to receive seal rings 9. The plug-in part 1 is thus sealed and is able to rotate in the receiving part 2. The receiving part 2 is provided with a standardized thread 24 to enable its connection to fittings.

In the installed condition, the plug-in part 1 and the receiving part 2 are surrounded by a housing 10. One side of the housing 10 is slipped or screwed on a cylindrical stud 11 of the receiving part 2 and fits flush against a shoulder 12 that is formed thereon. The inner edge of the housing 10 is equipped with a thread 13 whereby the housing 10 is screwed onto the stud 11. The other side of the housing 10 receives the plug-in part 1 with the bearing and holds the plug-in part 1 against the receiving part 2.

To enable holding the plug-in part securely, a bore 14 is made in the stud 11 into which a safety bolt can be screwed, particularly one in the form of a stud bolt 15 that is supported in the housing 10. After the installation the bore 14 is sealed with plastic material. The stud bolt 15 prevents any unintentional loosening of the housing 10.

A sealing ring groove 16 is placed on the inside surface of the housing 10 which faces the pressure hose, and a seal ring 9 is installed therein. This seal between the receiving part 2 and the plug-in part 1 prevents lubricants from leaking out and at the same time prevents dirt from entering.

The plug-in part 1 is able to rotate inside the housing 10 by means of the two angular ball bearings K1 and K2. At the same time it is used as the inner race for both bearings. Two V-shaped grooves 18 are machined in the plug-in part 1 so that the angle-bisecting end of each groove intersects the axis of rotation of the plug-in part 1 at 45°. Both angle-bisecting ends intersect at a right angle. Balls 19 made of roller bearing steel run in both grooves 18. Both ball bearings are assembled in a so-called X-arrangement. The axial distance between the two ball bearings K1 and K2 is as large as possible and the size of this spacing is about that of the outside diameter of the hollow pin 4.

The outer race of the rear ball bearing facing the pressure hose is formed by an inclined path 20 which is machined at 45° into the inside diameter of the housing 10. The outer race of the forward ball bearing facing the receiving part 2 is formed by a thrust collar 21. The thrust collar 21 has the same outside diameter as the plug-in part 1. The hollow pin 4 projects into the central bore 7 of part 2. Two disk springs 22 which also rest against the stud 11 press thrust collar 21 against the ball bearing. In this case, the balls 19 of the forward ring (leftmost) bearing K1 run on inclined paths 23 of the thrust collar 21. The bearing centers itself by means of the thrust collar which is biased by with the strong spring force of the disk springs 22. Since the components expand with rotational symmetry under the effect of heat, an automatic centering of the plug-in part in the receiving part is assured in every case. Due to the special arrangement of the ball bearings on an inner ring, the use of the thrust collar 21 achieves the simultaneous biasing of both ball bearings inasmuch as the thrust collar 21, which is biased by the spring force, presses both bearings against the inclined path 20.

The rotating joint is surrounded by a contact protection 17, particularly a cylinder-shaped perforated plate, which is attached or preferably welded to the receiving part 2. The contact protection 17 shields the sometimes hot components, thereby assuring the safe handling of the rotating joint.

When assembling the rotating joint, the balls 19 are first inserted into the grooves 18 and the thrust collar 21 and the disk springs 22 are slipped over the hollow pin 4. The housing 10 with the contact protection 17 is then guided from behind over the hose spout 3. The pressure hose can now be clamped over the hose spout 3 by means of the pairs of clamp shells. The plug-in part 1 can now be inserted into the receiving part 2 and screwed tight by means of the thread 13 against the pressure of the disk springs 22. It thereby centers itself. Once the housing 10 rests against the shoulder 12, the stud bolt 15 can be screwed into the bore 14. Finally the bore 14 is sealed with plastic material.

Figure 2:
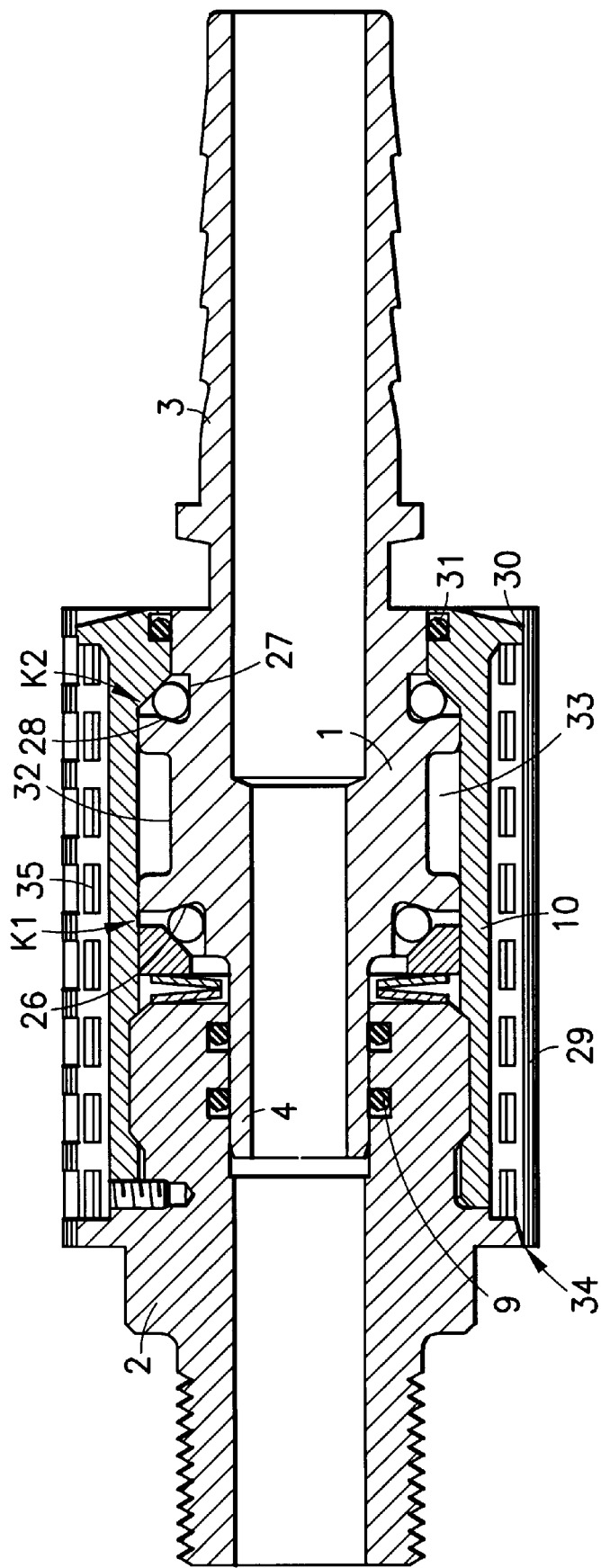
FIG. 2 is a rotating joint with wide grooves.

FIG. 2 illustrates an embodiment of the rotating joint in which each of the grooves 26 and 28 define between them at an angle of 75°. In that case, one of the walls 27 of the grooves is parallel to the axis of the plug-in part. The other wall 28 has an angle of 15° from the vertical. The angle-bisecting end of the grooves intersects the axis of rotation of the plug-in part 1 at 37.5°. The axial distance between both ball bearings K1 and K2 is about 1.5 times the outside diameter of the hollow pin 4. A contact protection 29 is welded to the receiving part 2 so that it touches as small a surface as possible on the edge 30 of the plug-in part 1. The other end of the contact protection 29 rests against a narrow surface 34 of the receiving part 2. The seal 31 which is located between the housing 10 and the plug-in part 1 prevents the entrance of impurities on the one hand, and on the other ensures the exit of steam during a potential damage of the seal rings 9.

In the illustrated embodiment of the rotating joint, the surface 32 of the plug-in part 1 has cutouts 33 which enlarge the surface and thereby contribute to a good heat transfer. The contact protection has openings 35 which allow air to circulate and thus contribute to the heat transfer.

We claim:

1. A rotating joint for pressure hoses, comprising a plug-in part (1) formed with a projecting hollow pin (4) that projects into and is sealed against a receiving part (2), where the plug-in part is surrounded by a housing (10) which is joined (15) to the receiving part (2), a thrust collar (21) disposed axially between said receiving part (2) and said plug-in part (1), and two angular ball bearings (K1, K2) arranged on a common axis which are elastically biased and are located between said receiving part (2) and said plug-in part (1), one bearing (K1) adjacent said receiving part (2) and one bearing (K2) remote from said receiving part (2), wherein said thrust collar (21) serves as an outer race (23) for said receiving-part-adjacent bearing (K1), said housing (10) serves as an outer race for said receiving-part-remote bearing (K2), and said plug-in part (1) serves as an inner race for said two bearings and wherein the angular ball bearings (K1, K2) have respective axes of rotation which intersect inside the rotating joint and wherein an outer race (20) of the ball bearing (K2) remote from the receiving part, is and inclined path (20) formed in the housing (10).

2. A rotating joint as claimed in claim 1, wherein said receiving part (2) is formed with a central bore (7) and wherein said thrust collar (21) applies elastic bias to said bearings (K1, K2), said thrust collar (21) being slipped over the hollow pin (4), coaxially with respect to said central bore (7) of the receiving part (2).

3. A rotating joint as claimed in claim 2, further comprising at least one annular disk spring (22) placed on the hollow pin (4) between the receiving part (2) and the thrust collar (21).

4. A rotating joint as claimed in claim 3, wherein spring pressure of the at least one annular disk spring (22) is transmitted via said thrust collar to a first one (K1) of the ball bearings and thence to a second one (K2) of the ball bearings.

5. A rotating joint as claimed in claim 1, wherein said two angular ball bearings have a common element (1) which provides an inner race (18) for each bearing.

6. A rotating joint as claimed in claim 5, wherein the common inner race is integrally connected to the plug-in part (1).

7. A rotating joint as claimed in claim 5, wherein a spacing between the inner races (18) of said bearings (K1, K2) corresponds approximately to an outside diameter of the hollow pin (4).

8. A rotating joint as claimed in claim 5, wherein bearing surfaces in the form of grooves (18) for balls (19) are provided in said common element (1), and have a V-shaped profile.

9. A rotating joint as claimed in claim 1, wherein said housing (10) coaxially surrounds at least a portion of the receiving part (2) and is secured thereto with a stud bolt (15).

10. A rotating joint as claimed in claim 1, wherein an internal thread (13) is formed on the housing (10), and the housing (10) is screwed by means of said thread to a stud portion (11) on the receiving part (2).

11. A rotating joint as claimed in claim 1, wherein the plug-in part (1) is equipped with a hose spout (3) adapted to receive and engage a pressure hose.

12. A rotating joint as claimed in claim 11, wherein a seal ring (9) is placed in a groove (16) between the plug-in part and the housing (10), on the side of the housing that faces the pressure hose.

13. A rotating joint as claimed in claim 1, further comprising a sleeve (17) surrounding the housing (10) to prevent direct contact therewith.

14. A rotating joint as claimed in claim 1, wherein the hollow pin (4) projects into a bore (7) in the receiving part (2), in which grooves (8) are provided for receiving seal rings (9).

15. A rotating joint as claimed in claim 1, wherein the surface (32) of the plug-in part (1) has cutouts whereby heat is dissipated.

* * * * *

UNITED STATES PATENT AND TRADEMARK OFFICE
CERTIFICATE OF CORRECTION

PATENT NO. : 6,003,907
DATED : December 21, 1999
INVENTOR(S) : Gau, et. al.

It is certified that error appears in the above-identified patent and that said Letters Patent is hereby corrected as shown below:

Column 4, line 17 "2" should be --1--.

line 19 after "forward," delete "ring."

line 51, "at" should be deleted.

Signed and Sealed this

Twelfth Day of September, 2000

Attest:

Q. TODD DICKINSON

Attesting Officer      Director of Patents and Trademarks